United States Patent Office

J. WARREN BROWN, OF WASHINGTON, DISTRICT OF COLUMBIA, ASSIGNOR TO NORTON P. CHIPMAN, A. A. HOSMER, C. D. GILMORE, AND J. C. SMITH.

Letters Patent No. 62,312, dated February 26, 1867.

IMPROVEMENT IN THE MANUFACTURE OF PEARL-ASHES.

The Schedule referred to in these Letters Patent and making part of the same.

TO WHOM IT MAY CONCERN:

Be it known that I, J. WARREN BROWN, of the city of Washington, in the District of Columbia, have invented a new and valuable Improvement in Means for Manufacturing Pearl-Ashes from potashes and house-ashes; and I do hereby declare that the following is a full, clear, and exact description of my said invention.

The object of my invention is to change pot-ashes and house-ashes into pearl-ashes by a more simple and economical method and process than has heretofore been devised for that purpose.

I find, upon careful study and experiment, that commercial potash is a very impure hydrate of potassa, or a compound of water with the oxide of the metal potassium, while pearl-ash is a tolerably pure carbonate of potassa, or a compound of carbonic acid with the oxide of potassium. To convert pot-ash into pearl-ash, therefore, it is necessary to remove the greater part of the impurities, and to substitute carbonic acid in the place of the water. I remove the impurities, to a great extent, by dissolving the potash in water, and allowing the soluble impurities to settle. I substitute carbonic acid for water by various methods, the cheapest and most economical of which is to pass carbonic acid over or through the solution of potash while the same is being evaporated. This may be done by suitable conduits from the fire, by which the evaporating process is carried on, leading into or immediately over the solution. When, however, it is found inconvenient or inexpedient to pass the carbonic acid directly from the fire to the solution, I mix charcoal, coke, coal, peat, saw-dust, or other substances rich in carbon, with the solution of potash, or the salts thereof, and expose the compound to a high temperature in the presence of atmospheric oxygen. The carbonate of potassa is obtained with equal perfection by either of these processes, but the first mentioned has the advantage in cheapness and simplicity. I refine the carbonate thus obtained by solution, evaporation, and the process called scorching, well known to all manufacturers of pearl-ashes. The amount of carbonic acid required to displace the water of potash is dependent, to a great exent, upon the purity of such potash. When that article is pure, twenty-two pounds of carbonic acid are required for every fifty-six pounds of pot-ash. The production of this amount of carbonic acid requires the consumption of about six pounds of charcoal, or its equivalent. Carbonic acid is formed readily when vegetable or animal substances are burned, with free access of air, from the union of their carbonaceous principle with atmospheric oxygen. It occurs in nature, combined with the oxide of iron, manganese, copper, zinc, lead, carbonates of soda, baryta, strontia, magnesia, &c. It may be separated from these substances by strong ignition, or by using sulphuric, muriatic, or nitric acids, for that purpose. Whenever I substitute carbonic acid for the water of the hydrate of potassa, by mixing charcoal therewith, in solution or otherwise, I usually pulverize the charcoal, and use from ten to twenty bushels of charcoal to one ton of potash, the amount depending upon the purity of the potash and the character of the charcoal used. I sometimes mix a small quantity of charcoal with the solution or salts of potash when I find that sufficient carbonic acid has not been incorporated therein by the process first mentioned. The operator will readily know when the salts are sufficiently carbonated, by their appearance in the oven, when placed there for the operation known as scorching. If they rise and swell like properly leavened bread, they will easily become transformed into pearl-ash, but otherwise more carbonic acid must be incorporated therein. Ashes burned in log heaps do not require the incorporation of carbonic acid in their products; but ashes burned in stoves and the like are found to be deficient in that commodity, and hence must be treated, when changed to ley, substantially as a solution of potash.

I am aware that the substance called black muck has been used in the manufacture of pearl-ashes from pot-ashes and house-ashes. I do not, therefore, claim the use of that commodity in the manner and form in which it has been found to be available heretofore.

What I claim as my invention, and desire to secure by Letters Patent, is—

1. The manufacture of pearl-ashes from potash or house-ashes by means of charcoal, coke, coal, peat, sawdust, and other substances rich in carbon, excepting black muck, in the manner herein set forth, substantially as described.

2. Passing carbonic acid over or into the solution of potassa, or the ley of house-ashes, from the fire by which the same is being evaporated, substantially as herein specified.

J. WARREN BROWN.

Witnesses:
J. CLEMENT SMITH,
C. D. GILMORE.